Patented June 11, 1946

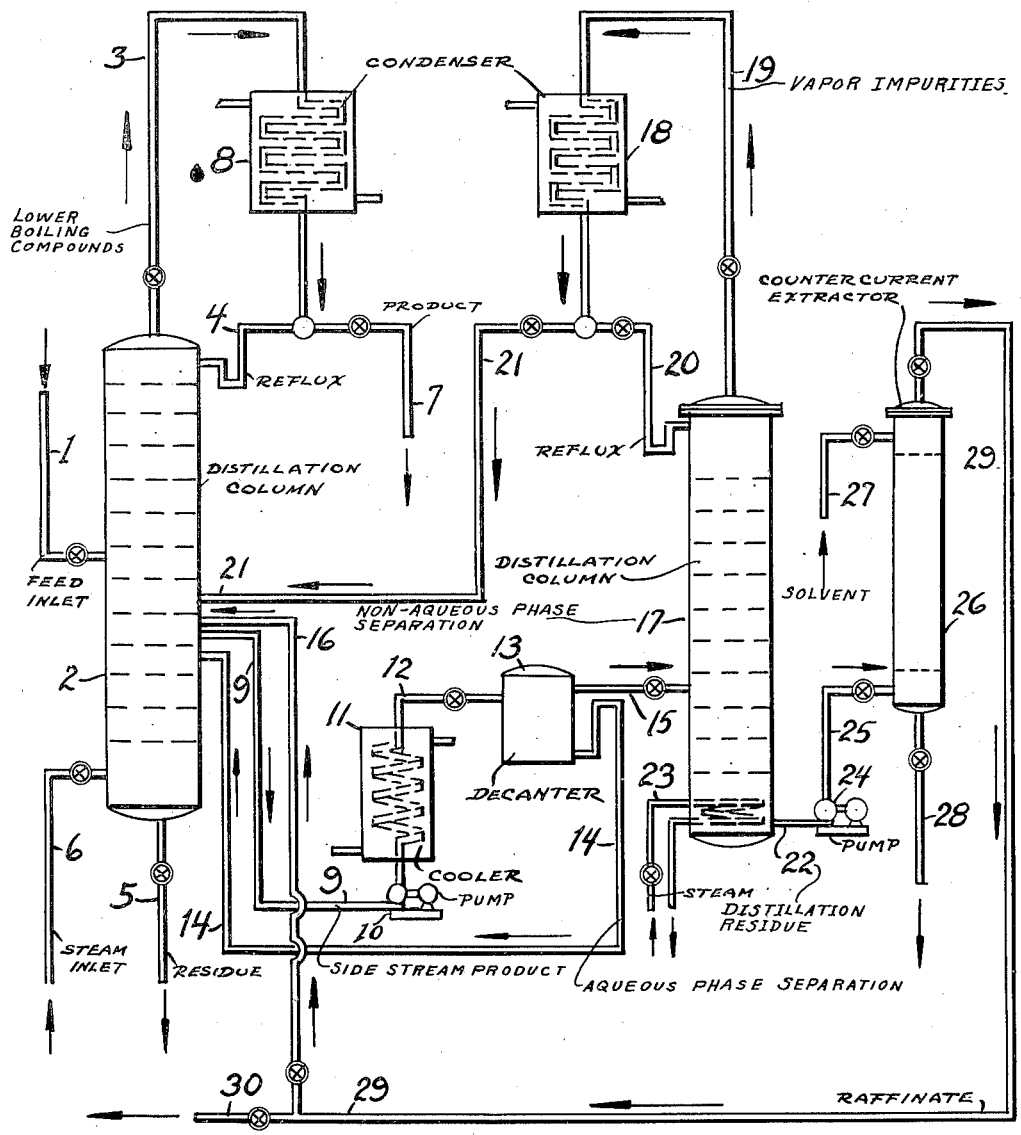

2,402,077

UNITED STATES PATENT OFFICE 2,402,077

PURIFICATION OF MONOHYDRIC ALCOHOLS

John A. Patterson, Westfield, N. J., assignor, by mesne assignments, to Standard Alcohol Company, a corporation of Delaware Application December 18, 1941, Serial No. 423,505

1 Claim. (Cl. 202—41)

This invention relates to the purification of a lower monohydric alcohol which contains, among other impurities, water and compounds which boil at a temperature higher than that of the lower monohydric alcohol, and which form constant boiling mixtures with water. It relates particularly to the purification of isopropyl alcohol from the treatment of propylene with sulfuric acid.

Due to particular processes by which certain organic liquids of commercial importance are prepared, many problems in purification arise which require easy and relatively inexpensive means of solution. This is particularly important in the preparation of the purified lower monohydric alcohols prepared from olefins by treatment with sulfuric acid. By the hydrolysis of the liquor obtained from the treatment of olefins with sulfuric acid, the crude alcohol contains as impurities large quantities of water and smaller amounts of low boiling hydrocarbons, higher molecular weight alcohols, esters, ethers, ketones and the corresponding sulfur compounds. The high boiling impurities are usually very soluble in the lower alcohols and may or may not have appreciable solubility in water when pure, but are particularly soluble in water in the presence of the lower alcohols. The higher boiling materials tend to form constant boiling mixtures with water when mixtures are distilled. These constant boiling mixtures with water boiling at lower temperatures than either the higher alcohols or water are difficult to separate from the alcohol by simple distillation.

In the operation of an ordinary distillation column in which any of the monohydric alcohols containing up to about five carbon atoms in the molecule are being concentrated, the distillate material is normally a concentrated alcohol while the distillation residue is water. In such a system any higher boiling alcohols or other high boiling materials relatively insoluble in water are held back from the top of the column by maintaining the temperature below the boiling point of the constant boiling mixtures which these substances form with water. The higher alcohols are also prevented from being withdrawn in the distillation residue due to the formation of the constant boiling mixtures with water which boil at a lower temperature than water which is the main distillation residue. Thus the high boiling materials tend to concentrate in an intermediate part of the column. Separation of such materials can be effected by withdrawing them in a side stream which contains also relatively large quantities of water and/or the lower alcohol undergoing purification.

It has now been found that in the purification of one of the lower monohydric alcohols, by the addition to the rectifying column either in the feed or immediately above or adjacent to the point of withdrawal of side stream product of a carefully controlled amount of a chemically inert liquid of particular physical characteristics, there can be established a highly satisfactory and economic purification process. The physical characteristics of a suitable additive liquid are that it must be relatively immiscible with water but miscible with the high boiling impurities and which will either form a constant boiling mixture with water at approximately the same temperature as the mixture of the impurities with water, or will form ternary azeotropes with the high boiling materials and water. By this means, the high boiling impurities can be satisfactorily removed from the system. As a feature of particular advantage, the solubility characteristics of the added material should be such that when the side stream material is cooled a separation of phases will occur and that the relatively non-aqueous phase thereof will contain almost all of the high boiling impurities in high concentration in the added liquid, while the aqueous phase will contain almost all of the water removed in the side stream together with a certain quantity of the lower alcohol undergoing purification. Operation under these advantageous conditions permits the recycling of the relatively aqueous phase to the concentrating column with its content of lower alcohol and the treatment of the relatively non-aqueous phase in any suitable manner to recover its content of added liquid and higher alcohols. The liquids particularly desirable as additives to the distillation system to effect these results are mineral oil fractions of about the same boiling range as that of the high boiling impurities or mineral oil fractions of close boiling range which have an initial boiling point with water from 10° F. or 20° F. above that of the high boiling impurities with water present in the crude supply, or particularly advantageous is the use of high boiling impurities previously extracted from the system.

The preferred procedure of the invention with regard to one of the monohydric alcohols containing up to about five carbon atoms in the molecule, is to distill the crude supply and to withdraw as a side stream a mixture of the high boiling impurities and an added liquid which contributes to the formation of a diphase system when the side stream material is allowed to cool to a convenient operating temperature in a decanter. The distillation residue in this operation is largely water and the distillate material concentrated alcohol. The aqueous phase from the decanter is recycled to the alcohol concentration column. The relatively non-aqueous phase, on the other hand, is distilled to recover the lower alcohol and water contents as distillate material and to obtain an essentially anhydrous mixture of the added liquid and higher alcohols as distillation residue. The distillate material from this relatively nonaqueous phase may be recycled to the alcohol concentrating column or if it contains a mixture which upon condensation separates into two phases, it may be recycled to the side stream decanter. The distillation residue from this relatively non-aqueous phase may be treated with water and the separation effected of the high boiling impurities. In this manner, the high boiling impurities are recovered in the extract as a dilute solution in the water, giving a raffinate containing the added material in relatively good concentration and suitable for recycling in this manner to the original alcohol concentrating column.

To present a further understanding of the invention, the following description of the processing of an organic liquid is presented which should be read in conjunction with the attached drawing. The drawing illustrates one form of suitable equipment for effecting the process of the invention in a completely continuous manner.

The crude isopropyl alcohol is supplied through line 1 to the distillation column 2. The liquid of suitable characteristics according to the invention may be added either with the feed through line 1 or separately as hereinafter discussed. For the purpose of this description, it will be taken that the liquid is added with the feed through line 1. The column 2 is furnished with the usual overhead vapor, reflux, product and residue lines 3, 4, 7 and 5, respectively, and with an open steam coil 6 for heating purposes. The isopropyl alcohol in a relatively pure state is removed from the system by line 7 as the result of maintaining adequate heat input at steam coil 6 and the maintenance of appropriate reflux through line 4 from condenser 8. Through line 5 is taken from the system condensed steam and excess water as the distillation residue. The side stream product containing a considerable quantity of water is removed from the system through line 9, passed through pump 10, cooler 11, line 12 and allowed to settle in the decanter 13. Time is allowed in the decanter 13 for the separation of phases which are presumed to occur for the purpose of this description as a result of the suitable choice of additive liquid supplied with the feed through line 1. The relatively aqueous layer formed in the decanter 13 is recycled through line 14 to the rectifying column 2. The relatively non-aqueous layer from the decanter 13 is removed through line 15 to the distillation column 17 which is furnished with the usual condenser, vapor, reflux, product and bottoms withdrawal equipment indicated by reference numerals 18, 19, 20, 21, and 22. Heat is supplied to the column by means of the heating unit 23. Thus the portion of the distillate material not utilized as reflux through line 20 is recycled through line 21 to the rectifying column 2.

The distillation residue removed through line 22 normally contains high boiling compounds of commercial value such as secondary butyl alcohol when purification is effected of isopropyl alcohol prepared from the treatment of propylene with sulfuric acid. Furthermore, this distillation residue contains other high boiling compounds which can be conveniently utilized as an additive material according to the process of the invention. In order to recover these products, the distillation residue from column 17 is passed through pump 24 and line 25 to the extractor 26 wherein the residue is treated countercurrently with a solvent to remove either the impurities or the organic liquid separately. In the drawing, it is presumed that the distillation residue undergoing treatment in the extractor 26 is that obtained from supplying to the rectifying column 2 crude isopropyl alcohol prepared from the treatment of propylene with sulfuric acid. With this specific illustration in view, the residue withdrawn from the column 17 from line 22 consists essentially of an anhydrous mixture of butyl alcohol and high boiling water insoluble compounds. This material is presumed in the diagram to be countercurrently treated with water supplied through line 27. The aqueous extract was withdrawn through line 28. This material, in the case of the specific illustration chosen, consists of a dilute solution of secondary butyl alcohol in water essentially free of other high boiling impurities. The raffinate as indicated being withdrawn through line 29 consists essentially of high boiling impurities in high concentration essentially free of secondary butyl alcohol and water. In the specific illustration taken of the purification of isopropyl alcohol, an appropriate amount of the material removed from the extractor 26 through line 29 may be returned through line 16 to the rectifying column 2 and be employed as a suitable additive liquid to the rectifying column 2 according to the present invention. The excess material may be removed from the system through line 30. While the processing of the distillation residue from column 17 has been specifically described in regard to the purification in the rectifying column of isopropyl alcohol prepared by the action of sulfuric acid on propylene, it is obvious that with slight modifications and variations in procedure, the residues from other similarly related liquids may be processed.

The following data obtained from the treatment of isopropyl alcohol prepared by the action of sulfuric acid on propylene specifically illustrates the process of the invention when the impurities extracted from a previous purification of crude isopropyl alcohol are employed as the additive liquid according to the requirements of the invention. The crude isopropyl alcohol supplied to the rectifying column 2 was of about 50% concentration. When this crude isopropyl alcohol was distilled under rectifying conditions and the side stream product passed into decanter equipment 13, diphase separation occurred. The relatively non-aqueous phase which formed had the following composition:

| | Percent by weight |
|---|---|
| Isopropyl alcohol | 12.1 |
| Butyl alcohol | 50.8 |
| Higher boiling material | 11.4 |
| Water | 25.7 |

By fractional distillation of this material the following products were obtained:

| | Lbs. dist./100 lbs. of relatively non-aqueous phase of side stream products (decanter 13) |
|---|---|
| Distillate fraction 1—Isopropyl alcohol | 13.8 |
| Distillate fraction 2—Butyl alcohol-water | 70.3 |
| Distillate fraction 3—Anhydrous butyl alcohol | 0.0 |
| Residue—High boiling material | [1] 15.9 |

[1] Containing 28% water.

When the residue was allowed to settle, a diphase separation occurred. The upper phase of this material consisted largely of a concentrated solution of high boiling material with some butyl alcohol and water. When an amount of this phase, equal to approximately 50% of the relatively non-aqueous phase from decanter 13, was returned continuously to the rectifying column 2 through line 16, an upper relatively non-aqueous phase was obtained in decanter 13 of the following composition:

| | Weight per cent |
|---|---|
| Isopropyl alcohol | 4.4 |
| Butyl alcohol | 22.0 |
| Higher boiling material | 72.8 |
| Water | 0.8 |

When this upper phase material was distilled under rectifying conditions identical to those previously employed in the distillation of the upper phase material obtained without the material through line 16, the following results were obtained:

| | Lbs. dist./100 lbs. of relatively non-aqueous phase of side stream products (decanter 13) |
|---|---|
| Distillate fraction 1—Isopropyl alcohol | 5.0 |
| Distillate fraction 2—Butyl alcohol-water | 0.7 |
| Distillate fraction 3—Anhydrous butyl alcohol | 1 13.4 |
| Residue—High boiling material | 2 80.9 |

1 61% recovery of butyl alcohol in the side stream relatively non-aqueous phase.
2 Contains 10% by weight secondary butyl alcohol.

In this distillation separation of anhydrous butyl alcohol from the residue was effected more easily than with the original side stream upper phase because of the greater spread in boiling points in the absence of water.

Thus, the process involves adding to the crude supply during distillation a chemically inert liquid which is readily miscible with the high boiling impurities but relatively immiscible with water and which is the presence of the impurities and water can form constant boiling mixtures boiling at temperatures close to that of the constant boiling mixtures of the impurities with water so as to cause the separation of side stream material containing the added liquid and the impurities boiling at the temperature higher than that of the organic liquid being purified. The side stream material when the added liquid is most suitably chosen separates into two phases, namely, a relatively aqueous phase and a relatively non-aqueous phase containing almost all the high boiling impurities separated in the side stream. Thus, the relatively non-aqueous phase can be recycled to the distillation system and assist in the further removal of the higher boiling impurities from the distillation system in concentrated form in a simple, convenient and economic manner. It is clear that the method is particularly applicable to the purification of ethyl alcohol as produced by fermentation and the extraction from the crude liquor of fusel oil, and it is also applicable for the removal of higher alcohols produced in the synthesis of methyl alcohol from carbon monoxide and hydrogen.

It is to be understood from the description as given that while the invention has been generally described and reference made to a particular embodiment, many variations and modifications therefrom can be made.

What is claimed is:

An improved continuous process for the purification of isopropyl alcohol obtained by the treatment of propylene with sulfuric acid, which comprises adding to the crude isopropyl alcohol undergoing distillation under reflux conditions water-insoluble high boiling compounds separated as impurities from crude isopropyl alcohol in a previous distillation, removing the purified isopropyl alcohol as a distillation product, also removing from the same distillation a side stream containing the said water-insoluble high boiling impurities, allowing the phases to separate, recycling the relatively aqueous phase to the distillation system, subjecting the relatively non-aqueous phase to a secondary distillation, passing the distillate thus obtained to the initial distillation system, countercurrently treating residue of the said secondary distillation with water to remove water-soluble impurities, to provide the resulting water-insoluble impurities as recycle for the said addition to the crude isopropyl alcohol.

JOHN A. PATTERSON.